UNITED STATES PATENT OFFICE.

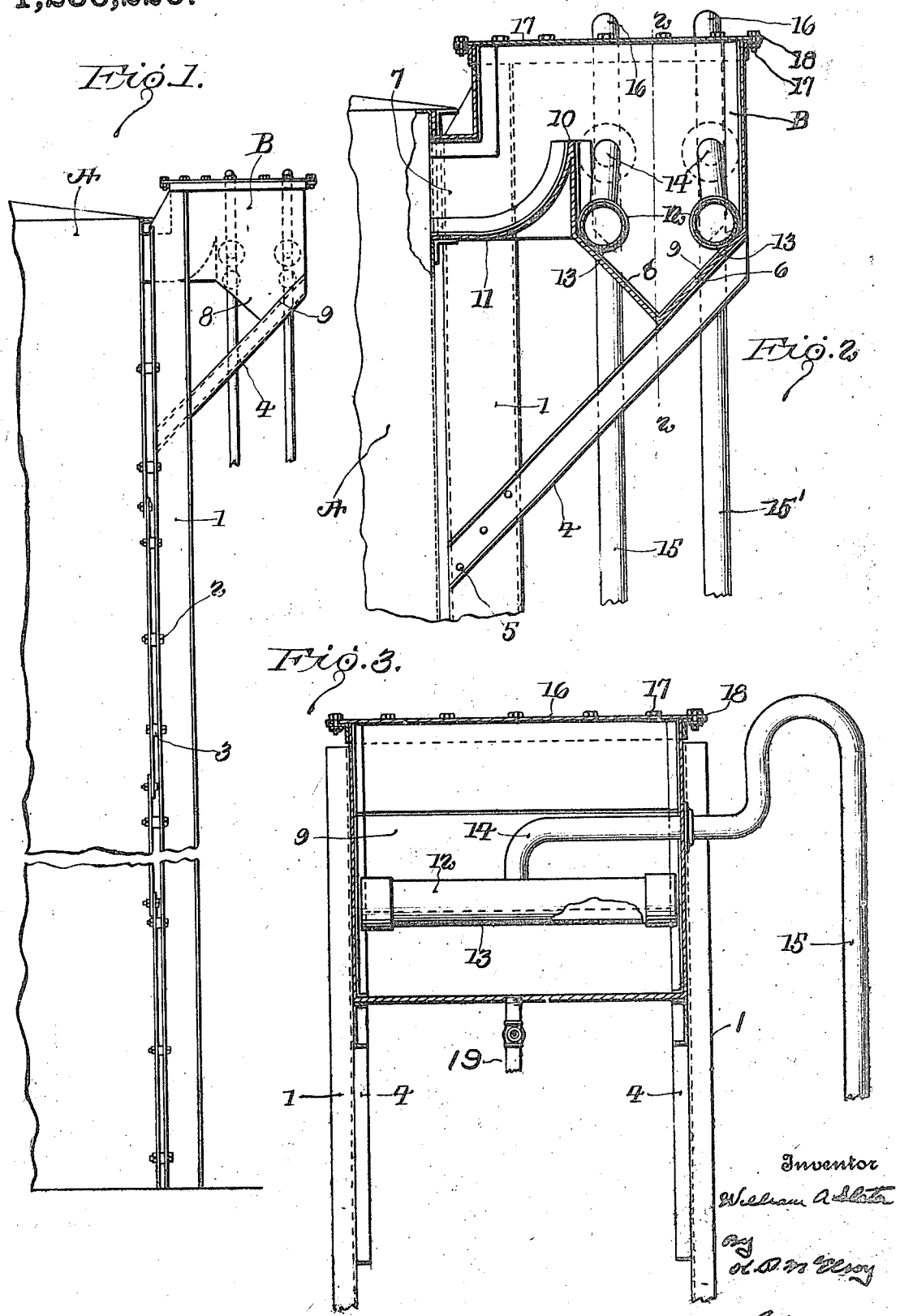

WILLIAM A. SLATER, OF FORT WORTH, TEXAS, ASSIGNOR TO GULF REFINING COMPANY, OF PITTSBURGH, PENNSYLVANIA, A CORPORATION OF TEXAS.

FIRE-EXTINGUISHER.

1,236,220.   Specification of Letters Patent.   Patented Aug. 7, 1917.

Application filed April 27, 1917. Serial No. 164,885.

*To all whom it may concern:*

Be it known that I, WILLIAM A. SLATER, a citizen of the United States, residing at Fort Worth, in the county of Tarrant and State of Texas, have invented certain new and useful Improvements in Fire-Extinguishers, of which the following is a specification.

This invention relates to fire extinguishers; and it comprises an oil tank provided with a particular type of "foam box", said foam box being independently supported and being positioned above the normal liquid level in the tank, and communicating with said tank above said level, the bottom of said box being substantially V-shaped and there being means located within the foam box through which foam producing chemicals may be delivered at the lowest point in said foam box while rising foam is delivered into the tank from a higher point of said box, and said tank being provided with a plurality of angle irons extending vertically adjacent to the foam box, said angle irons being spaced away from the tank, and the foam box being secured to said angle irons by means of braces; all as more fully hereinafter set forth and as claimed.

A well known method of extinguishing oil fires is to use a foaming aqueous liquid; the foam rendering the liquid sufficiently light to float on the oil and thereby prevent access of air. Water alone of course has no extinguishing value since burning oil floats on it. The foam is ordinarily made by mixing a solution of a carbonate (generally sodium carbonate or bicarbonate) with a dilute acid such as sulfuric acid, or with other solution capable of acting on carbonates with evolution of carbon dioxid. A solution of alum or of sulfate of alumina is often used. Ordinarily something having the property of making foams permanent is also used. Saponin (extract of soapbark, soaproot, etc.), licorice or waste products from licorice manufacture, Iceland moss, Irish moss, etc., are employed as such an agent. A foam from a pure acid and a pure carbonate breaks readily, but with something colloid in the solution the bubbles become relatively permanent.

The materials used are best mixed and foam produced prior to bringing into contact with the oil. Admixture in the presence of the oil is not advantageous.

Foam-producing devices or installations are often directly and permanently connected to the oil tanks used for storage of oils, such as petroleum oils. The connection is generally by a pipe extending up to a point near the top of the tank so that the materials may be delivered above the surface of the oil. Sometimes such a device is mounted on the tank wall near its top. Neither way is reliable since a fire may gain considerable headway prior to discovery with a resulting warping or collapse of the wall sufficient to place the connection or device out of action. Explosions within the tank may, similarly, also put out of action anything directly attached to the tank wall.

In the present invention I provide permanent means located near the top of the oil tank but spaced somewhat away therefrom and supported independently of the tank wall by a suitable standard. This much reduces the danger of fire or explosion within the tank putting the foam producing device out of action. Internally the foam producing device is so arranged as to allow a good and thorough admixture of the chemical with production of a rising foam, only this rising foam being drawn off. There is no utility in introducing into the oil tank anything but foam since any portion of liquid so introduced simply sinks through the body of oil and is useless and may be detrimental. To this end I provide a large open connection between the top of the foam box and the tank. The foam box below this connection is best, at least in part, triangular in section. The bottom of this V-shaped box should be well below the foam conduit. I provide means for introducing the foam producing chemicals, which are ordinarily two liquids, at a low point in the tapering box. The expanding foam requires more room than the liquids from which it is produced. Introduction of the liquids is through a pair of perforated pipes within the box with their perforations directed downwardly in or toward the sloping bottom. The liquids from the pipes flow down the slanting or sloping sides to the bottom and are there thoroughly mixed. Two supply pipes are provided between the liquid inlets of the foam box and sources of supply on the ground at a distance from the oil tank. A desirable way of supporting the foam box is to carry it from a pair of angle irons attached to the top of a standard spaced a little way from the oil tank. The standard may be and advantageously is connected to the oil tank wall but it should not be in heat communicating relationship thereto.

In the accompanying drawings I have shown more or less diagrammatically an embodiment of the present invention. In this showing—

Figure 1 is a fragmental view in elevation, showing a portion of an oil tank and a foam box connected thereto;

Fig. 2 is an enlarged view of a portion of Fig. 1 showing the foam box in section; and Fig. 3 is a vertical sectional view on the line 2—2 of Fig. 2.

Oil tank A may be of any suitable construction; and as fragmentarily shown is the usual tank employed for storing petroleum. The foam box of the present invention which is indicated as a whole by B is located near the top of this tank and communicates therewith through a suitable conduit. It is however not carried by the tank proper but by a pair of vertical standards 1 of angle iron or like material advantageously extending from the ground to a point substantially below the top of the tank. These uprights may be attached to the tank by rivets 2 or the like, but are spaced away therefrom by spacing rings or washers 3. This spacing away prevents the heat of the tank wall being communicated to the standards; and the standards not only serve to support the foam box but also to give stiffness to the tank wall. As shown, the foam box is carried from these standards by a pair of braces 4. These braces are secured to the standards by rivets or the like 5 and are attached to the box at 6. Conduit 7 leads into the top of the oil tank, and receives foam from a high point in the foam box. As shown, the top of the foam box is rectangular in cross-section and the bottom is provided with two plates or walls 8 and 9 coming together to give the stated shape at the bottom. The vertical wall above 9 extends to the top of the box while that above 8, element 10, extends only part way and virtually constitutes a dam between the box and the conduit since the box or casing extends laterally beyond this wall. The conduit has a prolongation 11 sloping up to the top of this dam wall and forming a part of the bottom of the casing. Within the foam box and just above the sloping or angular bottom are a pair of horizontal pipes 12, each provided with a number of relatively small perforations 13 on its under side to discharge liquids downwardly along the sloping bottom of the foam box. This arrangement of orifices gives a very good admixture of the chemicals. Connected to the horizontal pipes are supply pipes 14 continued outside the foam box as 15 and 15'. These prolongations reach down to the ground and to sources of supply (not shown) of carbonate solution and chemicals adapted to react therewith. They may of course be supplied by pumps or in any suitable way. At the top the foam box is provided with cover 16 secured by bolts 17 in flanges 18. At the bottom the foam box is provided with valved outlet 19 for cleansing and for removal of solutions.

The foam box may be made of any usual structural material such as iron or steel, but should be of relatively strong construction since it should be adapted to resist shocks from explosions or the like occurring in the tank and propagated through the wide open conduit between the box and the tank. A wide conduit is necessary for the quick introduction of great volumes of foam.

In the operation of the structure as shown the chemicals are supplied to the foam box in the form of minute jets downwardly directed on the angular bottom. Here they meet and produce gas as usual, forming a foam which rises upwardly while liquid remains at and settles toward the bottom. Only the foam rises to the top and overflows the dam into the tank. In the tank the foam floats on the oil surface and extinguishes combustion in the usual way.

The stated vertical standard of angle or channel irons form a valuable reinforcement for the oil tank at a point where stiffness is particularly desirable; the point where the foam box is located.

In use it is intended to have liquid only in the tapering bottom of the box, the space between the liquid level and the top of the dam forming a settling chamber for the foam; a chamber in which the liquid and the foam can separate. The top of the box is extended some distance above the top of the dam to give storage room for foam. The more desirable types of foam used for extinguishing the oil fires are often rather thick and sluggish in their flow and it is better to have ample chamber space for the accommodation of such a foam.

The foam box described may of course be directly attached to the top of the tank but for the reasons before stated it is better to provide the independent or semi-independent support shown.

After use, the foam box may be readily cleaned out by transmitting water through the supply pipes from any suitable connection (not shown) and removing it through 19.

What I claim is:—

1. In fire extinguishing means for oil tanks, an oil tank, vertical supports extending substantially below the top of the tank and secured to the outside thereof, a foam box carried by said supports at a point near the top of the tank, and a foam conduit connecting the top of the foam box with the top of the oil tank.

2. An oil tank provided with fire extinguishing means located near its top, such fire extinguishing means comprising a box-like casing with sides tapering toward the bottom, means located for delivering a pair of solutions onto said tapering sides and to cause them to flow toward the bottom and a conduit establishing communication between the top of said casing and the top of the oil tank.

3. An oil tank provided with fire extinguishing means located near its top, such fire extinguishing means comprising a box-like casing with a tapering bottom, a pair of horizontal pipes carrying perforations on their lower sides arranged within the casing near said tapering bottom and a conduit establishing communication between the top of said casing and the top of the oil tank.

4. The combination with an oil tank of a foam box located near the top thereof and in communication therewith, said foam box provided with slanting sides toward the bottom thereof, means within the box for delivering solutions above the bottom and onto said slanting sides, and supply pipes connected with said means.

5. The combination with a tank having an opening therein, of a foam box secured to the tank and having an outlet registering with said opening in the tank, the bottom of said foam box being provided with inclined walls, a dam between said outlet and inclined walls, and means for feeding substances into the foam box and over the inclined walls to mix said substances and to produce gases and foam destructive to combustion.

6. The combination with a tank, of a foam box and supports therefor, the box being provided with an outlet adapted to discharge the contents into said tank near the top thereof, and said supports comprising a beam secured to the tank, means for securing the box to the beam, and means for spacing the beam from the tank.

7. The combination with a tank of a foam box and supports therefor, the said supports comprising a beam extending substantially below the top of the tank and connected thereto but spaced away therefrom.

In testimony whereof I affix my signature hereto.

WILLIAM A. SLATER.